(12) United States Patent
Mills et al.

(10) Patent No.: US 8,362,705 B2
(45) Date of Patent: Jan. 29, 2013

(54) ANALOG LED CONTROLLER

(75) Inventors: Robert Clarence Mills, Canyon, TX (US); Daniel Deane McCabe, Amarillo, TX (US)

(73) Assignee: COLORlight, LLC, Canyon, TX (US)

( * ) Notice: Subject to any disclaimer, the term of this patent is extended or adjusted under 35 U.S.C. 154(b) by 0 days.

(21) Appl. No.: 13/163,410

(22) Filed: Jun. 17, 2011

(65) Prior Publication Data

US 2012/0319590 A1   Dec. 20, 2012

(51) Int. Cl.
*H05B 37/02* (2006.01)
*G05F 1/00* (2006.01)

(52) U.S. Cl. ..................... 315/224; 315/307

(58) Field of Classification Search .......... 315/291, 315/307, 308, 312, 224, 246, 209 R
See application file for complete search history.

(56) References Cited

U.S. PATENT DOCUMENTS

| | | | |
|---|---|---|---|
| 3,540,343 A | 11/1970 | Rifkin | |
| 3,635,121 A | 1/1972 | Knauff | |
| 3,845,468 A | 10/1974 | Smith | |
| 4,265,159 A | 5/1981 | Liebman et al. | |
| 4,305,117 A | 12/1981 | Evans | |
| 4,355,348 A | 10/1982 | Williams | |
| 4,420,711 A | 12/1983 | Takahashi et al. | |
| 4,928,568 A | 5/1990 | Snavely | |
| 5,784,096 A | 7/1998 | Paist | |
| 7,169,995 B2 | 1/2007 | Lin | |
| 7,190,279 B2 | 3/2007 | Atris et al. | |
| 7,206,015 B2 | 4/2007 | Tang et al. | |
| 7,230,392 B2 | 6/2007 | Clark et al. | |
| 7,583,244 B2 | 9/2009 | Werner et al. | |
| 7,586,762 B2* | 9/2009 | Hsu ........................... 363/21.12 | |
| 8,058,815 B1* | 11/2011 | Hardy ........................ 315/291 | |
| 2009/0174343 A1 | 7/2009 | Lenz et al. | |
| 2011/0084608 A1* | 4/2011 | Lin et al. ..................... 315/77 | |
| 2011/0133645 A1* | 6/2011 | Kuo et al. .................... 315/77 | |

* cited by examiner

*Primary Examiner* — Minh D A
(74) *Attorney, Agent, or Firm* — Daniel J. Chalker; Edwin S. Flores; Chalker Flores, LLP

(57) ABSTRACT

The present invention provides a cost effective analog apparatus to enable the user to obtain a display of varied color frequencies using a variety of LED light sources, both in the visual and non-visual ranges, acting in synchronous response to electronic input sources. The present invention provides an analog LED controller that includes a power supply terminal, an input terminal, and a plurality of color LED control circuits. The plurality of color LED control circuits include a first color LED control circuit, one or more nth color LED control circuits and a Nth color LED control circuit, wherein 1<n>N and N=a total number of the color LED control circuits.

31 Claims, 7 Drawing Sheets

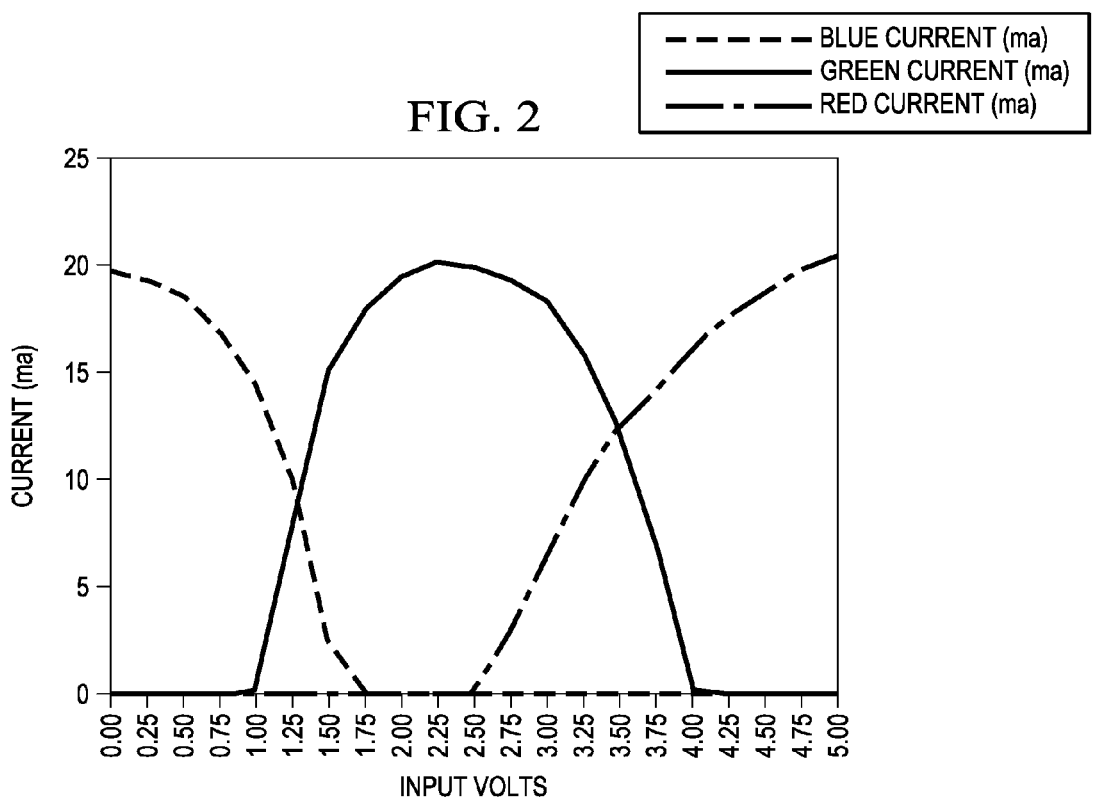
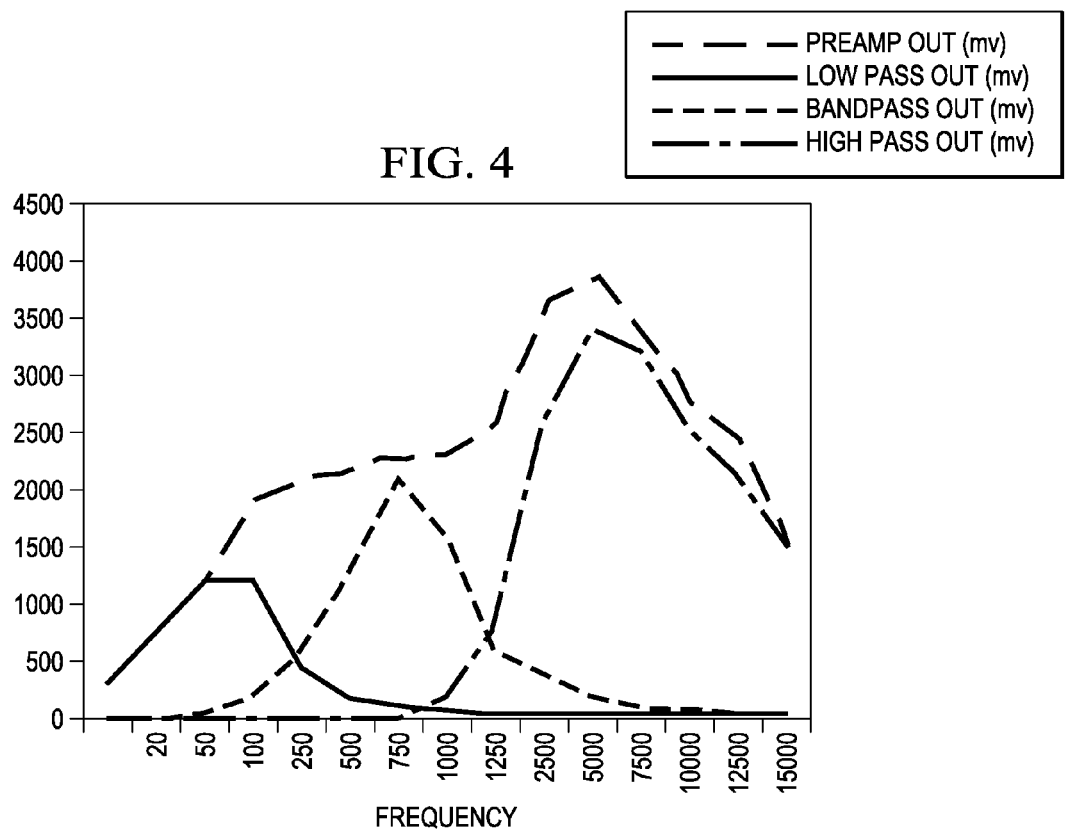

ANALOG LED CONTROLLER

FIELD OF THE INVENTION

The present invention relates generally to the field of control systems and, more particularly, to an analog controller that controls the color frequencies and intensities of light generated by light emitting diodes (LEDs).

BACKGROUND OF THE INVENTION

In recent years, the technology has become available to display varied color frequencies, both in the visual and non-visual ranges, using a variety of light emitting diode (LED) light sources.

For example, U.S. Pat. No. 7,169,995 to Kaun-Chung Lin uses complex digital circuitry to display certain colors based on audio frequencies and volume intensities. This technology requires comparators, analog to digital converters, integrators, a microprocessor and digital LED drive circuits, as well as internal programmed software routines and memory circuits to perform all described functions. The circuit is designed specifically for audio range frequencies. Its digital circuitry inherently produces Radio Frequency Interference. In addition, adding more LEDs requires additional circuitry.

U.S. Pat. No. 7,230,392 to Brett J. Clark describes analog control of light sources, however the capability of the disclosed circuitry is limited. As an example, the Clark device cannot generate maximum brightness from two different groups simultaneously, nor can it be completely dark or create white light. It cannot directly interface with commonly available audio devices. The device uses three LED groups with four LEDs per group. LEDs within two groups are wired in a series/parallel configuration. The maximum current allotment for all three groups is 43 ma. Additional LEDs cannot be added nor can LEDs be removed from the device without adversely impacting the operation of the circuit.

U.S. Pat. No. 7,190,279 to Youssef H. Atris describes a light modulation system for personal or portable electronic apparatuses. It requires the use of multiplexers. LEDs cannot be added to the same channel without adding additional driver circuit components for each additional LED. Its specified design can only provide full brightness for two LEDs.

Accordingly, there is a need for a LED controller that is cost effective, allows more LEDs to be added without additional circuitry, and does not produce Radio Frequency Interference.

SUMMARY OF THE INVENTION

The present invention provides a cost effective analog apparatus to enable the user to obtain a display of varied color frequencies using a variety of LED light sources, both in the visual and non-visual ranges, acting in synchronous response to electronic input sources. The present invention provides a LED controller that is cost effective, allows more LEDs to be added without additional circuitry, and does not produce Radio Frequency Interference.

In one embodiment, the present invention uses analog controls to simply and cost-effectively achieve a series of color frequency ranges progressing from a first color to a mix of first color with a second color to a second color to a mix of second color with a third color to a third color using colored light emitting diodes. As an example, the light could progress from blue to blue-green to green to yellow to orange to red. In accordance with this embodiment of the present apparatus, the color changes can be achieved by receiving varying input voltage signals ranging from 0 to 5 volts.

More specifically, the present invention provides an analog LED controller that includes a power supply terminal, a voltage reference source having a DC reference voltage, an analog input terminal, and a plurality of color LED control circuits. The plurality of color LED control circuits include a first color LED control circuit, one or more nth color LED control circuits and a Nth color LED control circuit, wherein $1<n>N$ and N=a total number of the color LED control circuits. The first color LED control circuit includes: (1) a first variable gain DC amplifier coupled with the power supply terminal, the voltage reference source and the input terminal, wherein the first variable gain DC amplifier provides (a) a maximum voltage gain whenever an input voltage at the analog input terminal is approximately equal to 0 VDC, and (b) a minimum voltage gain whenever the input voltage at the analog input terminal is approximately equal to or greater than $1/(N-1)$ of the DC reference voltage, (2) a first limiter coupled with the first variable gain DC amplifier, (3) a first LED driver circuit coupled with the power supply terminal and the first limiter, and (4) a first analog LED output terminal coupled to the first LED driver circuit. Each nth color LED control circuit includes: (1) a nth variable gain DC amplifier coupled with the power supply terminal and the input terminal, wherein the nth variable gain DC amplifier provides (a) the maximum voltage gain whenever the input voltage at the analog input terminal is approximately equal to $(n-1)/(N-1)$ of the DC reference voltage, and (b) the minimum voltage gain whenever the input voltage at the analog input terminal is approximately less than or equal to $(n-2)/(N-1)$ of the DC reference voltage or approximately equal to $n/(N-1)$ of the DC reference voltage, (2) a nth limiter coupled with the nth variable gain DC amplifier, (3) a nth LED driver circuit coupled with the power supply terminal and the nth limiter, and (4) a nth analog LED output terminal coupled to the nth LED driver circuit. The Nth color LED control circuit includes: (1) a fixed gain DC amplifier coupled with the power supply terminal and the input terminal, wherein the fixed gain DC amplifier provides a fixed maximum engineered voltage gain, (2) a Nth limiter coupled with the fixed gain DC amplifier, (3) a Nth LED driver circuit coupled with the power supply terminal and the Nth limiter, and (4) a Nth analog LED output terminal coupled to the Nth LED driver circuit.

In another embodiment, the present invention uses analog controls to simply and cost-effectively achieve full color frequency ranges from colored light emitting diodes. In accordance with this embodiment, the color changes can be achieved by receiving prescribed subsonic-to-ultrasonic frequency bands. The brightness of the LEDs is achieved by an increase or decrease of the amplitude and/or the frequency of the source.

More specifically, the present invention provides an analog LED controller that includes a power supply terminal, an analog input port, an amplifier coupled with the power supply terminal and the analog input port, and a plurality of color LED control circuits. The amplifier receives a time-varying signal from the input port and amplifies the time-varying signal using a non-linear frequency-based gain profile. The plurality of color LED control circuits includes a first color LED control circuit, one or more nth color LED control circuits and a Nth color LED control circuit, wherein $1<n>N$ and N=a total number of the color LED control circuits. The first color LED control circuit includes: (1) a first band-pass filter coupled with the power supply terminal and the amplifier, (2) a first limiter coupled with the first band-pass filter, (3) a first LED driver circuit coupled with the power supply terminal and the first limiter, and (4) a first analog LED output terminal coupled to the first LED driver circuit. Each nth color LED control circuit includes: (1) a nth band-pass filter coupled with the power supply terminal and the amplifier, (2) a nth limiter coupled with the nth band-pass filter, (3) a nth LED driver circuit coupled with the power supply terminal and the nth limiter, and (4) a nth analog LED output terminal coupled to the nth LED driver circuit. The Nth color LED control circuit includes: (1) a Nth band-pass filter coupled with the power supply terminal and the amplifier, (2) a Nth limiter coupled with the Nth band-pass filter, (3) a Nth LED driver circuit coupled with the power supply terminal and the Nth limiter, and (4) a Nth analog LED output terminal coupled to the Nth LED driver circuit.

In yet another embodiment, the present invention uses analog controls to simply and cost-effectively achieve full color frequency ranges including pinks, purples, yellows and whites from colored light emitting diodes. In accordance with this embodiment, the color changes can be achieved using manually adjustable components, such as potentiometers.

More specifically, the present invention provides an analog LED controller that includes a power supply terminal and a plurality of color LED control circuits. The plurality of color LED control circuits include a first color LED control circuit, one or more nth color LED control circuits and a Nth color LED control circuit, wherein 1<n>N and N=a total number of the color LED control circuits. The first color LED control circuit includes: (1) a first brightness control, (2) a first LED driver circuit coupled with the power supply terminal and the first brightness control, and (3) a first analog LED output terminal coupled to the first LED driver circuit. Each nth color LED control circuit comprising: (1) a nth brightness control, (2) a nth LED driver circuit coupled with the power supply terminal and the nth brightness control, and (3) a nth analog LED output terminal coupled to the nth LED driver circuit. The Nth color LED control circuit includes: (1) a Nth brightness control, (2) a Nth LED driver circuit coupled with the power supply terminal and the Nth brightness control, and (3) a Nth analog LED output terminal coupled to the Nth LED driver circuit.

The present invention enables LED synchronization of color frequencies to voltage change devices and frequency detection devices. Such devices would include but are not be limited to various means of detecting temperature, pressure, velocity, rotation, frequency variations and the like. Such devices currently exist in the form of meters, gauges, radio receivers, vibration detectors and the like.

In its various embodiments, the use of the disclosed apparatus is predicted to have an important impact in industrial, medical (both human and animal), commercial and green technologies. Various uses would be in the form of, but not limited to, instrumentation applications such as presenting separate or combined color displays for tracking variations of pressure, volume, heat, flow rate, frequency, velocity, acceleration and the like. These applications could provide visual indicators of conditions at some physical distance from the actual meters or indicators themselves or could function as stand-alone devices. They would serve as early indicators of change-of-state by virtue of the changing color variations.

As an example, if used as a rotational indicator with a color sequence set at blue, then green and then red, and the apparatus is set normally to show green for a range of specified RPMs, if the color starts changing from green to blue-green to blue, rotation is slowing, if changing from green to yellow to red, the rotation is increasing. The light would be visible at some physical distance as opposed to requiring close physical proximity to meters or other instrumentation.

Another example would be in the case of equipment that generates ultrasonic frequencies in a particular and critical range. Here again, varying color frequencies indicate a varying change-of-state that can be seen at a distance. In hospitals, these indicators can be used to indicate an increasing/decreasing change-of-state to be seen at a distance. This can provide an early warning of an impending problem where a matter of a few minutes could be critical. Commercial and household refrigeration/freezer units would benefit from this apparatus by providing early indication of a changing temperature inside the refrigeration/freezer unit. These are examples of a few of the uses of the disclosed apparatus. The apparatus provides useful and valuable visual information to any condition where an indication of change-of-state at a distance is appropriate.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 2 is a graph depicting the LED current response in milliamps to the increase in input voltage for the embodiment shown in FIG. 1;

FIG. 4 is a graph depicting the preamp and band pass filter voltage responses in millivolts to the variation in sonic frequency for the embodiment shown in FIG. 3;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to light emitting diode ("LED") controllers, but it will be understood that the concepts of the present invention are applicable to any analog light controller.

"LED" may indicate any type of light emitting diode, whether single, multicolored, infrared or ultraviolet. As used herein, the terms "Color 1", "Color 2", "Color 3", first color, nth color and Nth color can be of any color. These colors will typically be referenced as blue, green and red respectfully as one example of the selection of LED colors. Other colors may include yellow, white, ultraviolet and infrared.

The present invention provides a cost effective analog apparatus to enable the user to obtain a display of varied color frequencies using a variety of LED light sources, both in the visual and non-visual ranges, acting in synchronous response to electronic input sources. The present invention provides a LED controller that is cost effective, allows more LEDs to be added without additional circuitry, and does not produce Radio Frequency Interference.

Figure 1:
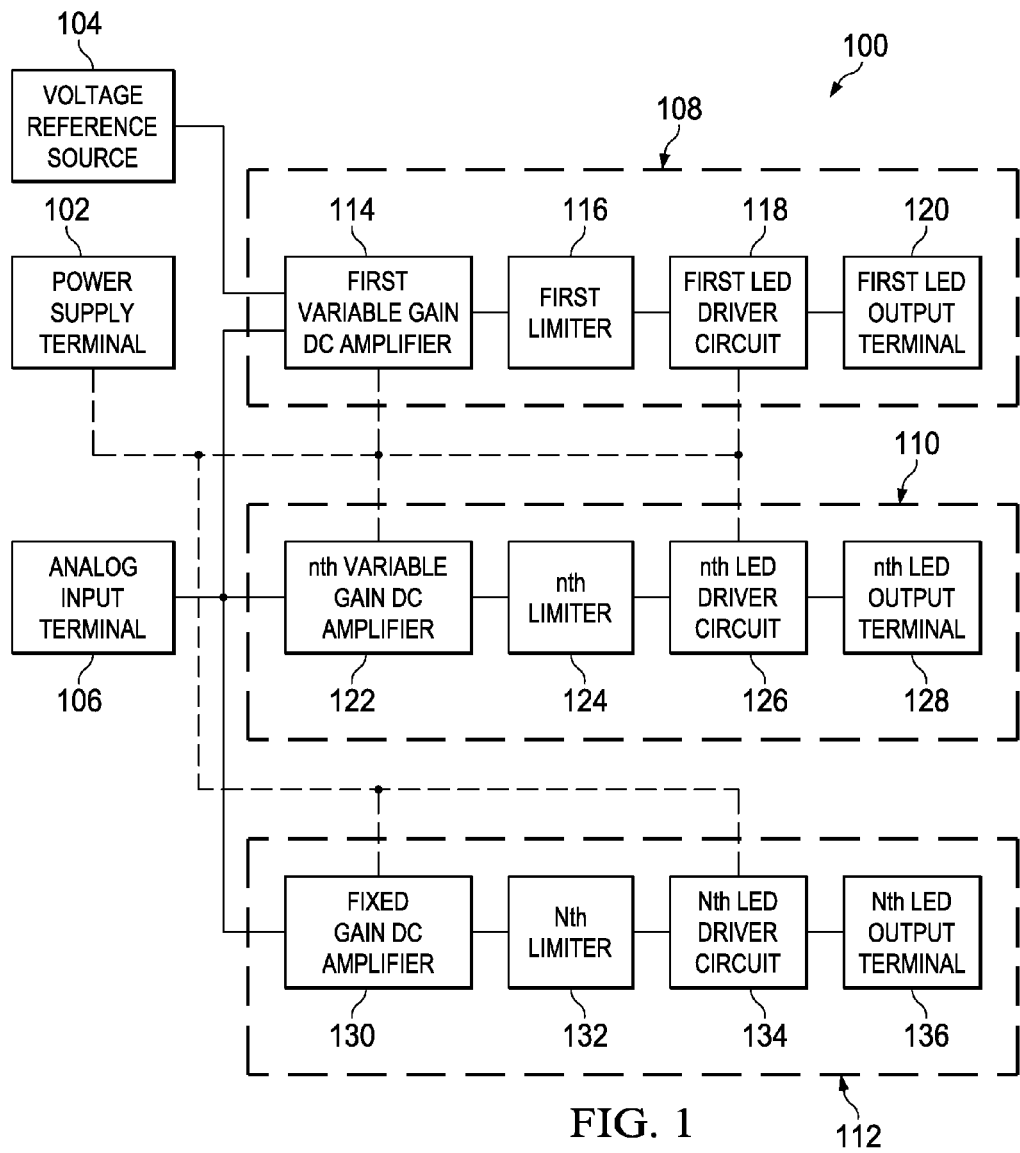
FIG. 1 is a block diagram of a Universal LED Controller in accordance with one embodiment of the present invention.

Now referring to FIG. 1, a block diagram of an analog LED controller 100 in accordance with one embodiment of the present invention is shown. This embodiment is also referred to as a Universal LED Controller. The present invention uses analog controls to simply and cost-effectively achieve a series of color frequency ranges progressing from a first color to a mix of first color with a second color to a second color to a mix of second color with a third color to a third color using colored light emitting diodes. As an example, the light could progress from blue to blue-green to green to yellow to orange to red.

The analog LED controller 100 includes a power supply terminal 102, a voltage reference source 104 having a DC reference voltage, an analog input terminal 106, and a plurality of color LED control circuits (e.g., 108, 110 and 112). The plurality of color LED control circuits include a first color LED control circuit 108, one or more nth color LED control circuits 110 and a Nth color LED control circuit 112, wherein 1<n>N and N=a total number of the color LED control circuits.

The first color LED control circuit 108 includes: (1) a first variable gain DC amplifier 114 coupled with the power supply terminal 102, the voltage reference source 104 and the input terminal 106, (2) a first limiter 116 coupled with the first variable gain DC amplifier 114, (3) a first LED driver circuit 118 coupled with the power supply terminal 102 and the first limiter 116, and (4) a first analog LED output terminal 120 coupled to the first LED driver circuit 118. The first variable gain DC amplifier 108 provides (a) a maximum voltage gain whenever an input voltage at the analog input terminal 106 is approximately equal to 0 VDC, and (b) a minimum voltage gain whenever the input voltage at the analog input terminal 106 is approximately equal to or greater than 1/(N−1) of the DC reference voltage.

Each nth color LED control circuit 110 includes: (1) a nth variable gain DC amplifier 122 coupled with the power supply terminal 102 and the input terminal 106, (2) a nth limiter 124 coupled with the nth variable gain DC amplifier 122, (3) a nth LED driver circuit 126 coupled with the power supply terminal 102 and the nth limiter 124, and (4) a nth analog LED output terminal 128 coupled to the nth LED driver circuit 126. The nth variable gain DC amplifier 122 provides (a) the maximum voltage gain whenever the input voltage at the analog input terminal 106 is approximately equal to (n−1)/(N−1) of the DC reference voltage, and (b) the minimum voltage gain whenever the input voltage at the analog input terminal 106 is approximately less than or equal to (n−2)/(N−1) of the DC reference voltage or approximately equal to n/(N−1) of the DC reference voltage.

The Nth color LED control circuit 112 includes: (1) a fixed gain DC amplifier 130 coupled with the power supply terminal 102 and the input terminal 106, (2) a Nth limiter 132 coupled with the fixed gain DC amplifier 130, (3) a Nth LED driver circuit 134 coupled with the power supply terminal 102 and the Nth limiter 132, and (4) a Nth analog LED output terminal 136 coupled to the Nth LED driver circuit 134. The fixed gain DC amplifier 130 provides a fixed maximum engineered voltage gain to fully illuminate the Nth LEDs whenever the input voltage at the analog input terminal 106 is approximately equal to the DC reference voltage.

The plurality of color LED control circuits 108, 110 and 112 are typically configured to control one or more color LEDs selected from the group of colors including blue, green, red, yellow, white, ultraviolet and infrared. Moreover, a power supply is typically coupled to the power supply terminal and one or more color LEDs are coupled to each of the plurality of analog LED output terminals 120, 128 and 136.

The present invention in its various embodiments enables LED synchronization of color frequencies to voltage change devices and frequency detection devices. Such devices would include but are not limited to various means of detecting temperature, pressure, velocity, rotation, frequency variations and the like. Such devices currently exist in the form of meters, gauges, instruments, radio receivers, vibration detectors, sensors and the like. For example, a sensor can be coupled to the analog input terminal 106. The sensor, instrument or other device can be used to measure pressure, volume, temperature, flow rate, frequency, velocity, acceleration, range, radiation, audible sound, inaudible sound, visible light, non-visible light, rotation, motion, heat, smoke, alignment, position, level, altitude, depth, mechanical parameters, electrical parameters, biological parameters, or chemical parameters. In such a case, the controller 100 provides a visual indication of a change-of-state of the sensor which is observable at a distance.

In its various embodiments, the use of the disclosed apparatus will have an important impact in industrial, medical, commercial and green technologies. Various uses would be in the form of, but not limited to, instrumentation applications such as presenting separate or combined color displays for tracking variations of pressure, volume, heat, flow rate, frequency, velocity, acceleration and the like. These applications could provide visual indicators of conditions at some physical distance from the actual meters or indicators themselves or could function as stand-alone devices. They would serve as early indicators of change-of-state by virtue of the changing color variations.

As an example, if used as a rotational indicator with a color sequence set at blue, then green and then red, and the apparatus is set normally to show green for a range of specified RPMs, if the color starts changing from green to blue-green to blue, rotation is slowing, if changing from green to yellow to red, the rotation is increasing. The light would be visible at some physical distance as opposed to requiring close physical proximity to meters or other instrumentation.

Another example would be in the case of equipment that generates ultrasonic frequencies in a particular and critical range. Here again, varying color frequencies indicate a varying change-of-state that can be seen at a distance. In hospitals, these indicators can be used to indicate an increasing/decreasing change-of-state to be seen at a distance. This can provide an early warning of an impending problem where a matter of a few minutes could be critical. Commercial and household refrigeration/freezer units would benefit from this apparatus by providing early indication of a changing temperature inside the refrigeration/freezer unit. These are examples of a few of the uses of the disclosed apparatus. The apparatus provides useful and valuable visual information to any condition where an indication of change-of-state at a distance is appropriate.

Referring now to FIG. 2, a graph depicting the LED current response in milliamps to the increase in input voltage for an embodiment of FIG. 1 is shown. In this example: (a) N=3, (b) the DC reference voltage is approximately 5 VDC, (c) the plurality of limiters 116, 124 and 134 limit a current to each analog LED output terminal 120, 128 and 136 to the maximum forward current of each LED connected to the analog LED output terminal 120, 128 and 136 (approximately 20 mA in this example), (d) the color LEDs include one or more blue LEDs, one or more green LEDs and one or more red LEDs, and a voltage and a current at each analog LED output terminal 120, 128 and 136 for a given input voltage correspond approximately to Table 1. Alternatively, tricolor LEDs can be used. Moreover, additional LEDs can be added to each set of LEDs without having to modify the controller 100. Finally, a gradual change in the input voltage results in a relatively smooth transition of colors from a first color to a nth color to a Nth color.

TABLE 1

| Input Volts | Blue Current (ma) | Green Current (ma) | Red Current (ma) | volts Blue | volt Green | volt Red |
|---|---|---|---|---|---|---|
| 0 | 19.8 | 0 | 0 | 1.29 | 0 | 0 |
| 0.25 | 19.3 | 0 | 0 | 1.29 | 0 | 0 |
| 0.5 | 18.5 | 0 | 0 | 1.235 | 0 | 0 |
| 0.75 | 17 | 0 | 0 | 1.15 | 0.125 | 0 |
| 1 | 14.5 | 0.2 | 0 | 1.03 | 0.209 | 0 |
| 1.25 | 10 | 7.9 | 0 | 0.835 | 0.35 | 0 |
| 1.5 | 2.5 | 15 | 0 | 0.41 | 0.753 | 0 |
| 1.75 | 0 | 17.8 | 0 | 0.205 | 1.08 | 0 |
| 2 | 0 | 19.4 | 0 | 0.126 | 1.213 | 0 |
| 2.25 | 0 | 20 | 0 | 0 | 1.23 | 0.144 |
| 2.5 | 0 | 19.8 | 0 | 0 | 1.179 | 0.191 |
| 2.75 | 0 | 19.3 | 2.6 | 0 | 1.09 | 0.355 |
| 3 | 0 | 18.3 | 6.2 | 0 | 0.955 | 0.58 |
| 3.25 | 0 | 16 | 9.6 | 0 | 0.766 | 0.75 |
| 3.5 | 0 | 12.6 | 12.2 | 0 | 0.45 | 0.87 |
| 3.75 | 0 | 7.2 | 14 | 0 | 0.279 | 0.98 |
| 4 | 0 | 0.3 | 16 | 0 | 0.209 | 1.06 |
| 4.25 | 0 | 0 | 17.5 | 0 | 0.177 | 1.14 |
| 4.5 | 0 | 0 | 18.6 | 0 | 0.132 | 1.2 |
| 4.75 | 0 | 0 | 19.7 | 0 | 0 | 1.33 |
| 5 | 0 | 0 | 20.3 | 0 | 0 | 1.36 |

Now referring to both FIGS. 1 and 2, the operation of the controller 100 connected to a +12 volt DC source (operating range from 10.8 to 14.2 volts) with a voltage reference source 104 of 5 volts DC. The controller 100 responds to the input voltage at the analog input terminal 106 ranging from 0 to 5 volts and, when used with a plurality of tricolor LEDs connected to LED output terminals 120 (blue), 128 (green) and 136 (red) will produce pure blue at 0 volts, pure green at approximately 2.5 volts, and pure red at or near 5 volts. Input voltages between these values will create a mixture of blue/green or green/red (shades of aqua, yellow, and orange) in accordance with FIG. 2. With 0 volts applied to the analog input terminal 106, the Blue (color 1) Variable Gain Amplifier (BVGA) 114 operates at maximum engineered voltage gain and applies sufficient voltage to its respective Limiter 116 and LED Driver 118 to fully illuminate the blue portion of the tricolor LEDs. The Limiter 116 prevents the LED Driver 118 from operating the LEDs beyond their maximum engineered current rating. Meanwhile, the Green (color 2) Variable Gain Amplifier (GVGA) 122 and Red (color 3) Fixed Gain Amplifier (RFGA) 130, being relatively lower gain circuits, do not apply enough voltage to either the green or red LEDs to illuminate them at all. As the input voltage increases toward 2.5 volts the gain of the BVGA 114 decreases causing the blue LEDs to dim while the GVGA 122 simultaneously begins to apply an increasingly higher voltage to its respective Limiter 124 and LED Driver 126 illuminating the green LEDs. Once the input voltage reaches 2.5 volts the gain of the BVGA 114 is no longer sufficient to apply enough voltage to its respective Limiter 116 and LED Driver 118 and the blue LEDs are completely extinguished. The green LEDs are now at maximum brightness and the red LEDs are still off As the input voltage increases from 2.5 volts toward 5 volts, the gain of the GVGA 122 begins to decrease causing the green LEDs to dim while the red LEDs now begin to illuminate. The voltage gain of the RFGA 130 is engineered so as to cause the red LEDs to function within the 2.5 to 5 volt input range. As the input voltage increases from 2.5 volts toward 5 volts the gain of the GVGA 122 begins to decrease causing the green LEDs to dim while the red LEDs now begins to illuminate. When the input voltage reaches approximately 5 volts, the green LEDs completely extinguish and the red LEDs reach maximum brightness. The simultaneous illumination and mixing of blue/green or green/red LEDs at different brightness levels creates shades of aqua, sea green, yellow, and orange as the input voltage varies between 0 to 2.5 volts and 2.5 to 5 volts. To an observer, a gradual input voltage change of 0 to 5 volts creates a relatively smooth transition of colors from blue to green to red. Inversely, a change from 5 to 0 volts causes color transitions from red to green to blue.

Figure 3:
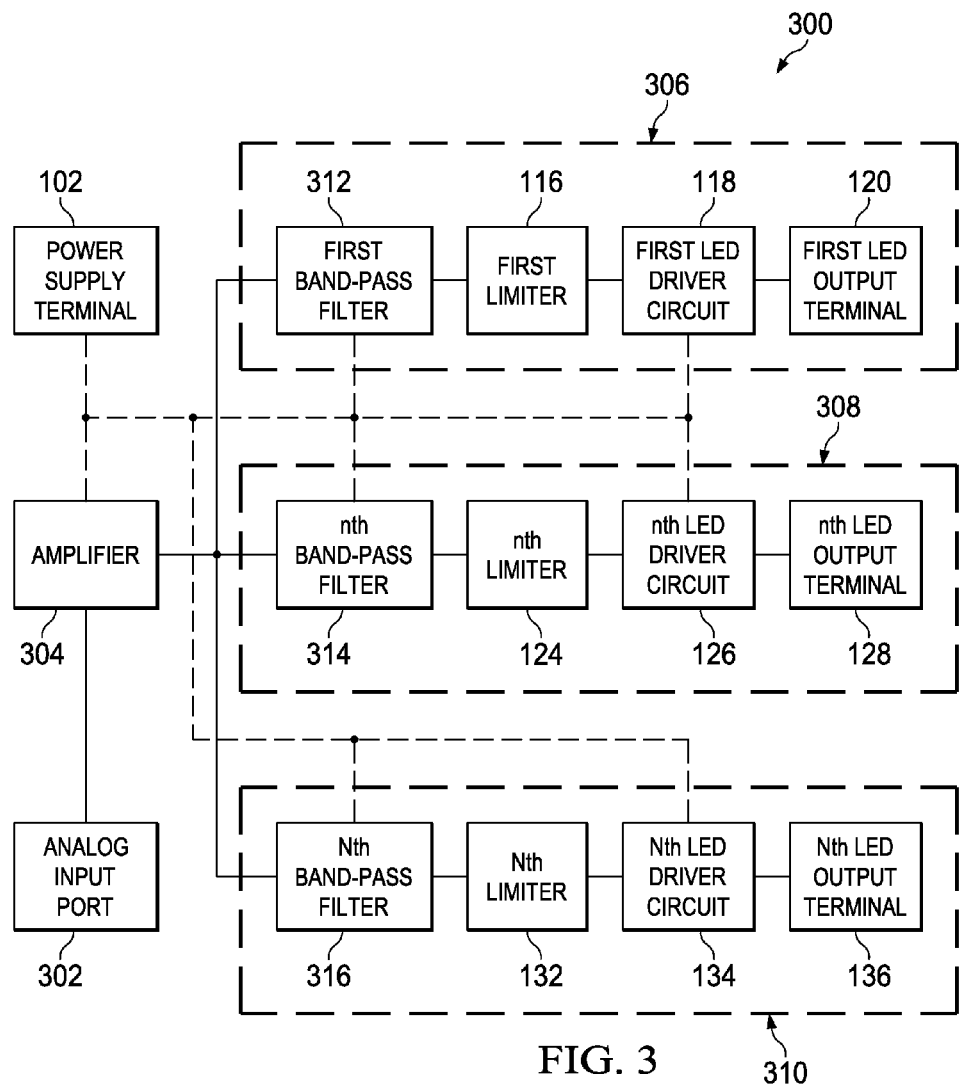
FIG. 3 is a block diagram of a Subsonic-to-Ultrasonic LED Controller in accordance with another embodiment of the present invention.

Referring now to FIG. 3, a block diagram of an analog LED controller 300 in accordance with one embodiment of the present invention is shown. This embodiment is also referred to as a Subsonic-To-Ultrasonic LED Controller. The present invention uses analog controls to simply and cost-effectively achieve full color frequency ranges from colored light emitting diodes. In accordance with this embodiment, the color changes can be achieved by receiving prescribed subsonic-to-ultrasonic frequency bands. The brightness of the LEDs is achieved by an increase or decrease of the amplitude and/or the frequency of the source.

More specifically, the analog LED controller 300 includes a power supply terminal 102, an analog input port 302, an amplifier 304 coupled with the power supply terminal 102 and the analog input port 302, and a plurality of color LED control circuits (e.g., 306, 308 and 310). The amplifier 304, which can be a preamplifier and equalizer, receives a time-varying signal from the input port 302 and amplifies the time-varying signal using a non-linear frequency-based gain profile. The plurality of color LED control circuits includes a first color LED control circuit 306, one or more nth color LED control circuits 308 and a Nth color LED control circuit 310, wherein 1<n>N and N=a total number of the color LED control circuits.

The first color LED control circuit 308 includes: (1) a first band-pass filter 312 coupled with the power supply terminal 102 and the amplifier 304, (2) a first limiter 116 coupled with the first band-pass filter 312, (3) a first LED driver circuit 118 coupled with the power supply terminal 102 and the first limiter 116, and (4) a first analog LED output terminal 120 coupled to the first LED driver circuit 118.

Each nth color LED control circuit 308 includes: (1) a nth band-pass filter 314 coupled with the power supply terminal 102 and the amplifier 304, (2) a nth limiter 124 coupled with the nth band-pass filter 314, (3) a nth LED driver circuit 126 coupled with the power supply terminal 102 and the nth limiter 124, and (4) a nth analog LED output terminal 128 coupled to the nth LED driver circuit 126.

The Nth color LED control circuit 310 includes: (1) a Nth band-pass filter 316 coupled with the power supply terminal 102 and the amplifier 304, (2) a Nth limiter 132 coupled with the Nth band-pass filter 316, (3) a Nth LED driver circuit 134 coupled with the power supply terminal 102 and the Nth limiter 132, and (4) a Nth analog LED output terminal 136 coupled to the Nth LED driver circuit 134.

The plurality of color LED control circuits 306, 308 and 310 are typically configured to control three or more color LEDs selected from the group of colors including blue, green, red, yellow, white, ultraviolet and infrared. Moreover, a power supply is typically coupled to the power supply terminal and one or more color LEDs are coupled to each of the plurality of analog LED output terminals 120, 128 and 136.

Referring now to FIG. 4, a graph depicting the preamp and band pass filter voltage responses in millivolts to the variation in sonic frequency for the embodiment of FIG. 3 is shown. Although this example is keyed to the audible frequency range, the invention can be used for any frequency range and is not limited to the audible frequency range. In this example: (a) N=3, (b) the plurality of limiters 116, 124 and 134 limit a current to each analog LED output terminal 120, 128 and 136 to the maximum forward current of each LED connected to the LED output terminal 120, 128 and 136 (approximately 20 mA in this example), (c) the color LEDs include one or more blue LEDs, one or more red LEDs and one or more green LEDs, and (d) the non-linear frequency-based gain profile corresponds to FIG. 4. Alternatively, tricolor LEDs can be used. Moreover, additional LEDs can be added to each set of LEDs without having to modify the controller 300. The voltages and corresponding colors for a given frequency are shown in Table 2. For example, a center frequency of the band-pass filters can be approximately 250 Hz, 1.2 kHz and 7 kHz, respectively, or approximately 100-250 Hz, 1 kHz and 7.5 kHz, respectively. The controller 300 accurately transforms the time-varying signal into a visual representation of the time-varying signal. For example, the non-linear frequency-based gain profile provides a balanced mix of colors whenever the time-varying signal is an audio signal. The time-varying signal in this example can be music, voice or other sounds within the audible frequency range. An audio playback device can be coupled to the input port 302.

TABLE 2

Preamplifier/Equalizer and Audio Filter Response

| Frequency (Hz) | Preamp Out (mV) | Low Pass Out (mV) | Band Pass Out (mV) | High Pass Out (mV) | LED Color |
|---|---|---|---|---|---|
| 20 | 320 | 310 | 0 | 0 | Blue |
| 50 | 750 | 750 | 0 | 0 | Blue |
| 100 | 1200 | <u>1200</u> | 50 | 0 | Blue |
| 250 | 1900 | 1200 | 200 | 0 | Blue |
| 500 | 2100 | 450 | 600 | 0 | Blue/Red |
| 750 | 2200 | 180 | 1300 | 0 | Red |
| 1000 | 2300 | 120 | <u>2100</u> | 0 | Red |
| 1250 | 2300 | 75 | 1600 | 200 | Red |
| 2500 | 2600 | 40 | 600 | 800 | Red/Green |
| 5000 | 3600 | 40 | 400 | 2600 | Green |
| 7500 | <u>3850</u> | 40 | 200 | <u>3400</u> | Green |
| 10000 | 3400 | 40 | 100 | 3200 | Green |
| 12500 | 2800 | 40 | 80 | 2500 | Green |
| 15000 | 2400 | 40 | 50 | 2100 | Green |
| 20000 | 1600 | 40 | 30 | 1500 | Green |

Notes:
1. Input level to the Preamplifier/Equalizer is 60 mV RMS at all test frequencies.
2. Output levels are AC peak (millivolts).
3. LED driver response tested flat from DC to 110 KHz.
4. Underlined values denote peak output at the specified frequency.

Now referring to both FIGS. 3 and 4, the operation of the controller 300 connected to a +12 volt DC source (operating range from 12 to 16 volts). This exemplary embodiment represents the apparatus' ability to use subsonic-to-ultrasonic frequencies and amplitudes to produce a synchronized visual light display of varying colors and intensities without producing Radio Frequency Interference. A suitable lens or light diffuser may be utilized with the LEDs to achieve a more diverse array of color changes. The controller 300 responds to the amplitude and frequency at the input port 302, when used with a plurality of tricolor LEDs connected to LED output terminals 120 (blue), 128 (red) and 136 (green) will produce realistic and real-time colors responding to frequency and amplitude ranges from subsonic to ultrasonic. Specific frequency ranges are determined based on the specific need of an application.

In this embodiment's example, the sonic range from 20 hz to 20,000 hz, referred to here as the inbound signal, will be used. The inbound signal is received at the input port 302. The inbound signal is amplified and equalized by a Preamp/Equalizer 304. The resulting signal is then split into three separate signals by a Low-Pass Filter 312, a Band-Pass Filter 314 and a High-Pass Filter 316. The outputs of each of these filters proceeds to the associated Limiters (116, 124, 132) where voltage control is invoked to protect the associated Driver Circuits (118, 126, 134) and their respective plurality of LEDs (120, 128, 136) from exceeding their operating parameters. Frequencies within the band of the Low-Pass Filter 312 increase the current to the low frequency driver 116 and results in more blue. Frequencies within the band of the Band-Pass Filter 314 increases the current to the mid range driver 126 resulting in more red. High-Pass Filter 316 frequencies increase the current to the high frequency driver 134 resulting in more green. As the frequencies change, so also do the LED colors change. An increase or decrease in the amplitude of the source frequencies corresponds to an increase or decrease in the voltage levels driving the LEDs. Overall, the reactions of the LEDs to the changes in frequency and amplitude result in synchronized changes of colors and intensities.

An individual group of a plurality of LEDs may consist of one to fifty same type LEDs (assuming 20 ma. maximum forward current per diode). Therefore the disclosed apparatus can control up to 150 LEDs (50 per group), or up to 50 tricolor LEDs. The maximum allotted current is 1 amp per group (3,000 ma. total) given the current (amperage) limitations of the power supply and analog driver components in this embodiment of the apparatus. A greater number of LEDs can be used by utilizing other power supplies and driver components based on current (amperage) demands. LEDs within a specific group are electrically connected in parallel and can, within the power supply constraints, simply be added or removed from the group without circuit modification.

Figure 5:
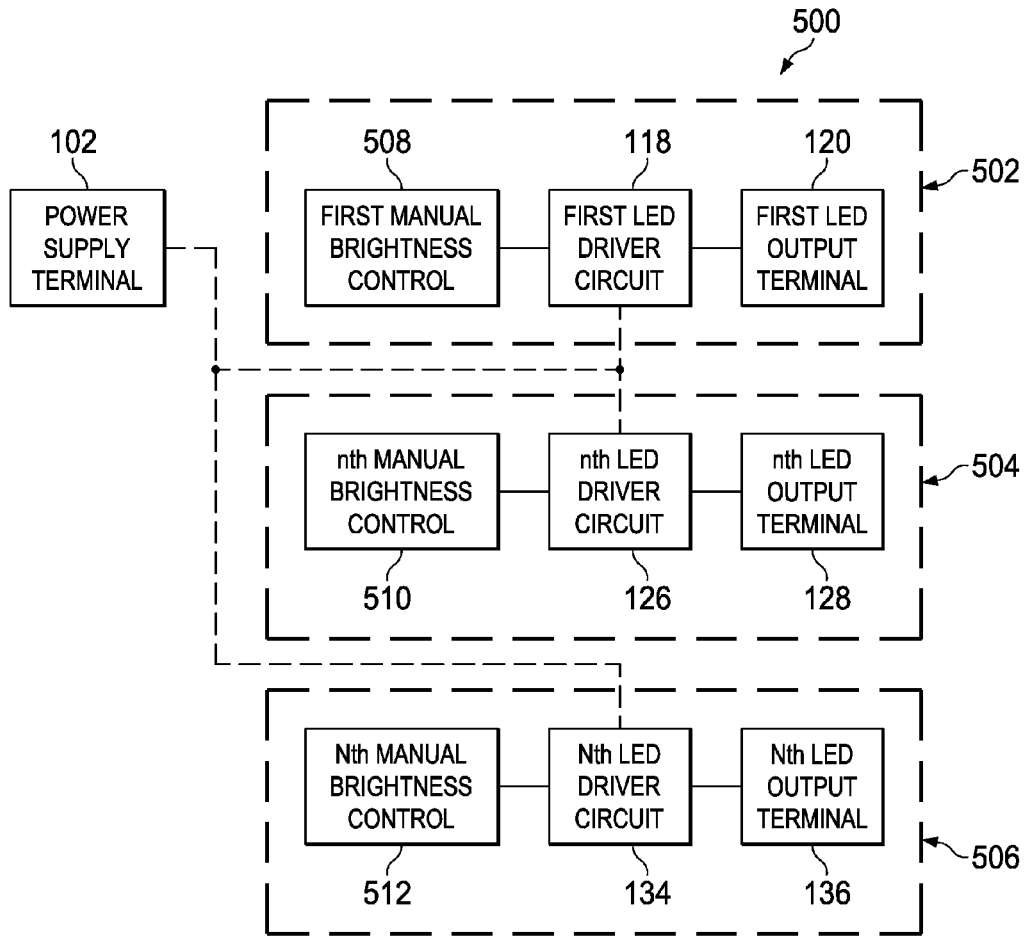
FIG. 5 is a block diagram of a Manual LED Controller in accordance with another embodiment of the present invention.

Referring now to FIG. 5, a block diagram of an analog LED controller 500 in accordance with one embodiment of the present invention is shown. This embodiment is also referred to as a Manual LED Controller that uses analog controls to simply and cost-effectively achieve full color frequency ranges including pinks, purples, yellows and whites from colored light emitting diodes. In accordance with this embodiment, the color changes can be achieved using manually adjustable components, such as potentiometers.

More specifically, the present invention provides an analog LED controller 500 that includes a power supply terminal 102 and a plurality of color LED control circuits (e.g., 502, 504 and 506). The plurality of color LED control circuits include a first color LED control circuit 502, one or more nth color LED control circuits 504 and a Nth color LED control circuit 506, wherein 1<n>N and N=a total number of the color LED control circuits. The first color LED control circuit 502 includes: (1) a first brightness control 508, (2) a first LED driver circuit 118 coupled with the power supply terminal 102 and the first brightness control 508, and (3) a first analog LED output terminal 120 coupled to the first LED driver circuit 118. Each nth color LED control circuit 504 includes: (1) a nth brightness control 510, (2) a nth LED driver circuit 126 coupled with the power supply terminal 102 and the nth brightness control 510, and (3) a nth analog LED output terminal 128 coupled to the nth LED driver circuit 126. The Nth color LED control circuit 506 includes: (1) a Nth brightness control 512, (2) a Nth LED driver circuit 134 coupled with the power supply terminal 102 and the Nth brightness control 512, and (3) a Nth analog LED output terminal 136 coupled to the Nth LED driver circuit 134.

The plurality of color LED control circuits 502, 504 and 506 are typically configured to control three or more color LEDs selected from the group of colors including blue, green, red, yellow, white, ultraviolet and infrared. Moreover, a power supply is typically coupled to the power supply terminal and one or more color LEDs are coupled to each of the plurality of analog LED output terminals 120, 128 and 136. The first brightness control 508, the nth brightness control 510 and the Nth brightness control 512 can be coupled to a diagnostic or testing device such that the diagnostic or testing device automatically controls the brightness of the LEDs in accordance to one or more criteria. For example, the diagnostic or testing device could drive the controller to display all or part the visible light spectrum to person to measure visual sensitivity, color blindness or other physiological and psychological responses or lack thereof. The person's responses can be recorded electronically or manually.

This embodiment illustrates the effective manual control of color frequencies and brightness of up to three groups of a plurality of LEDs using three Manual Brightness Controls. In this exemplary embodiment, the color LEDs connected to output terminals 120, 128 and 136 are blue, red and green respectfully. The controller 500 is designed to operate from a +12 volt DC source 102, but will function as described with a supply voltage ranging from 12 to 16 volts. Manual control is achieved through the use of the three Manual Brightness Controls (508, 510, 512), one Manual Brightness Control for each group which, in this example embodiment, are a Manual Brightness Control 508 (blue), a Manual Brightness Control 510 (red) and Manual Brightness Control 512 (green) although other colors could be used.

The Manual Brightness Controls connect to their associated analog LED Driver Circuits (508, 510, 512) and each applies an appropriate range of voltages allowing a continuously variable adjustment of a plurality of LED color frequencies and intensities ranging from completely dark to full illumination. When used with a plurality of tricolor LEDs (120, 128, 136) and suitable lenses or light diffusers, a wide variety of colors and intensities, including white can be achieved. As an example, decreasing the Manual Brightness Control 508, increasing the Manual Brightness Control 510 and increasing the Manual Brightness Control 512 may result in an orange color as the voltage to the blue LED is decreased and voltages to the red and green LEDs are increased. This described embodiment is an example only as various Manual Brightness Control designs may be appropriate to achieve the objectives described herein.

Figure 6:
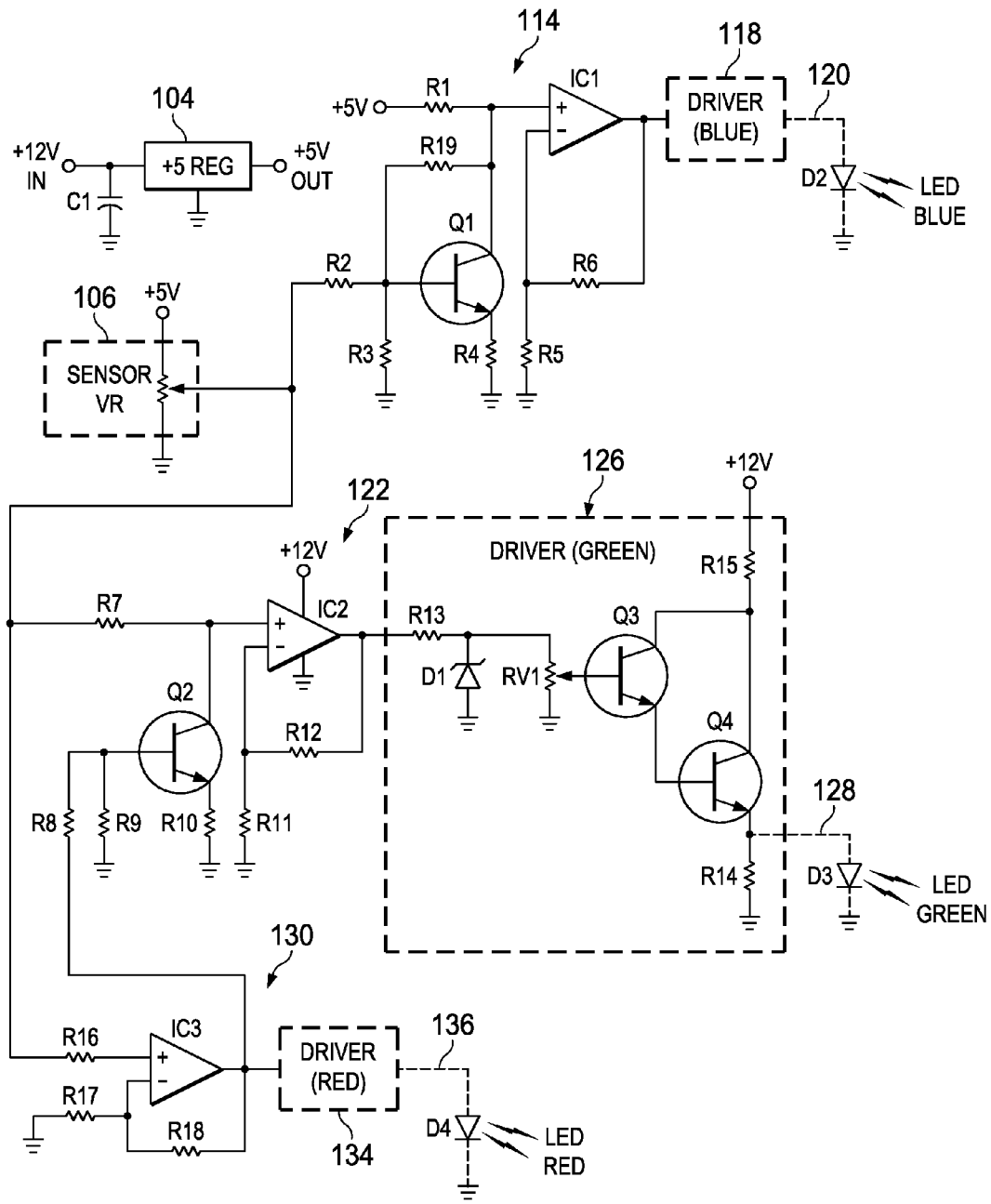
FIG. 6 is a circuit diagram of an exemplary embodiment of the present invention in accordance with FIG. 1.

FIG. 6 is a circuit diagram of an exemplary embodiment of the present invention in accordance with FIG. 1.

Figure 7A:
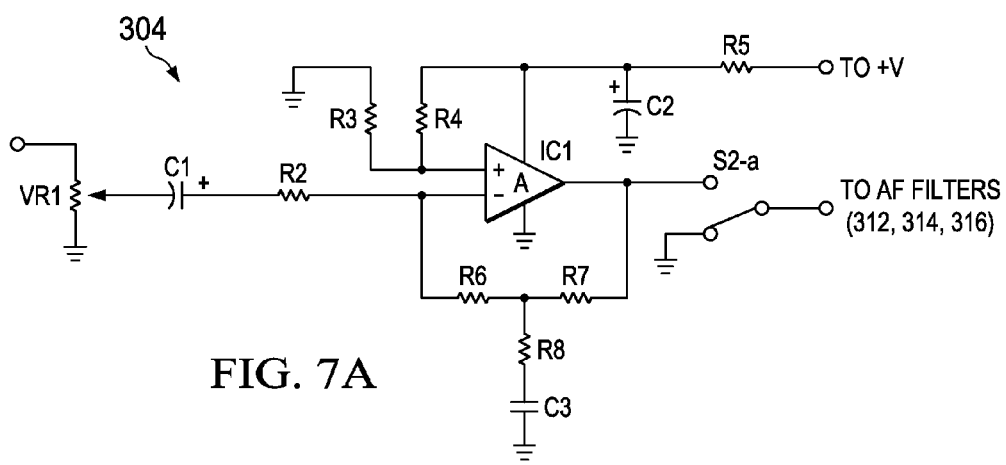
FIGS. 7A, 7B and 7C are circuit diagrams of an exemplary embodiment of the present invention in accordance with FIGS. 3 and 5.
Figure 7B:
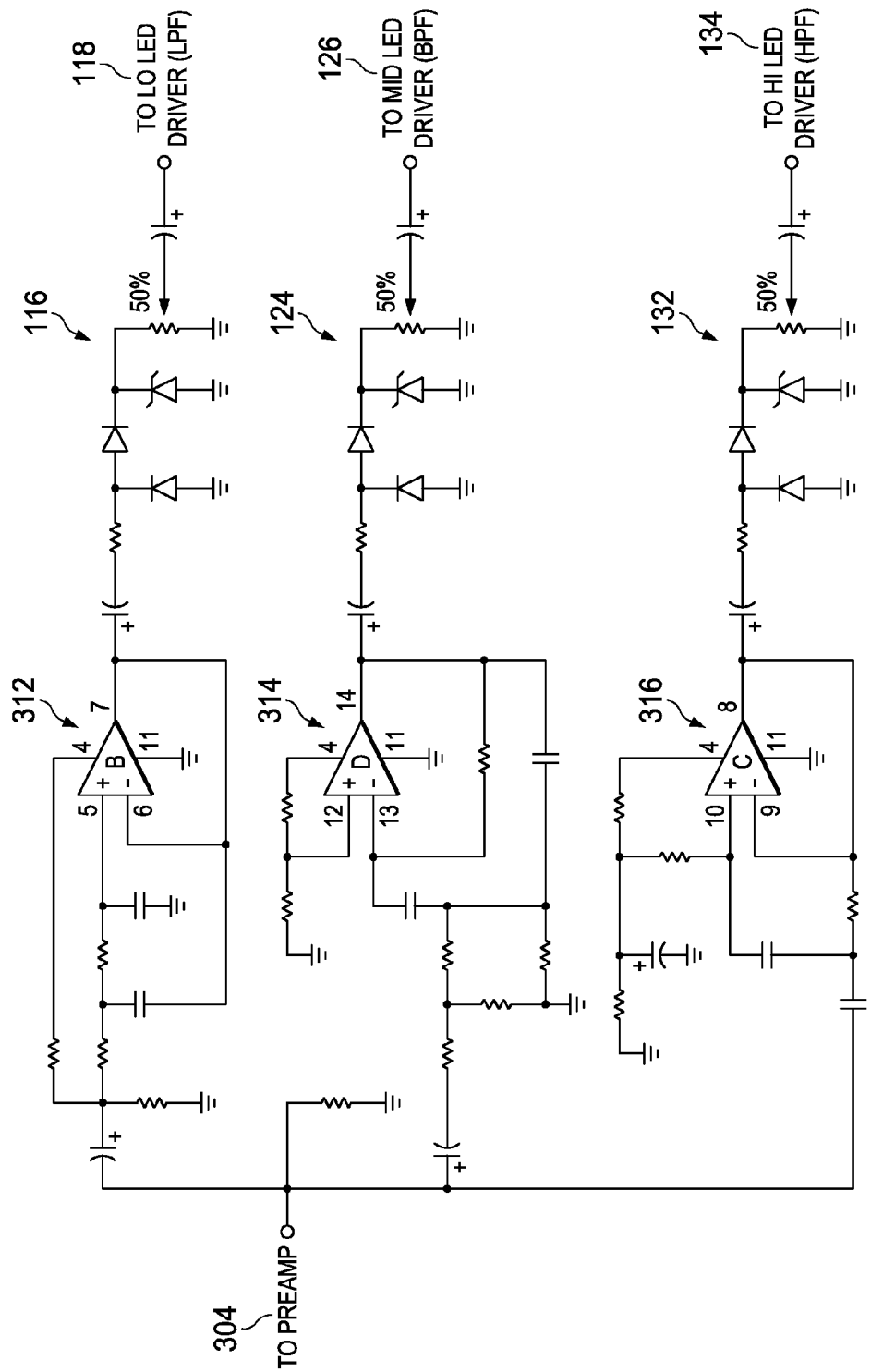
Figure 7C:
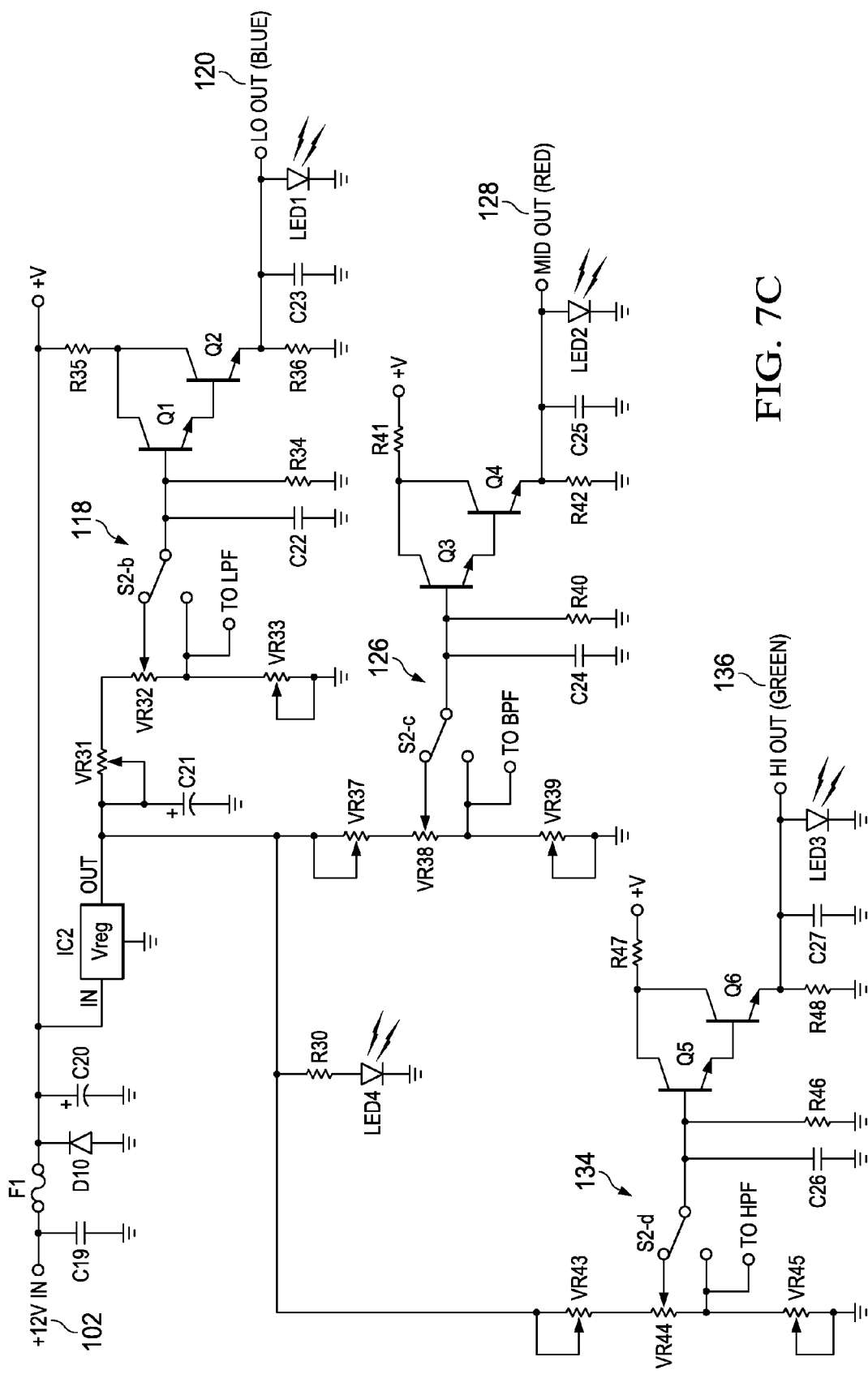

FIGS. 7A, 7B and 7C are circuit diagrams of an exemplary embodiment of the present invention in accordance with FIGS. 3 and 5. Note that switch S2 in FIG. 6C is used to switch between the sonic frequency mode of FIG. 3 and the manual mode of FIG. 5.

The present invention as described above can be used in the following applications (note that this list is not all inclusive and does not limit the invention to applications not listed herein):

1. Medical applications:
    Patient/equipment and other apparatus conditions:
        ADHD/Autism/Alzheimer's—use color with/without music to aid patients' coping skills, etc
        Blood Pressure
        Heart rate
        Respiration
        Oxygenation
        Flow rates
            Gasses
                Oxygen
                Anesthetics
            Fluids
                Blood
                IVs
                Anesthetics
        Stethoscopic evaluation
    Hearing impairment
    Security
        Voice recognition comparator
        Notification of vibrations indicating person at door/on driveway, etc
2. Transportation/Stationary vehicles/machinery applications (ground/air/sea/space):
    Flow rates
        Gasoline
        Air
        Emissions
    Vibrations
        Engine
        Steering
    Pressure
        Tires
        Injectors
        Lubricant
    Power
        Battery charge/degradation
    Heat sensing
3. Green applications:
    Visual vibration/fault indicator on wind generators
    Fuel consumption efficiency of internal combustion engines
    Faulty alignment of solar panels
    Power generation efficiency indicator
    Air/Water quality indicator
    Battery charge/discharge indicator—as in electric automobiles
    Use infrared/ultraviolet LEDs along with the LED controller
    Environmental controls—residential/commercial buildings
4. Weather indicators:
    Barometric pressure indicator
    Wind speed
    Wind direction
    Humidity
    Rainfall
    Temperature
    Minor earthquake detector
    Dust particles
    Air/water contaminants
5. Aeronautics
    Wind speed
    Wind sheer
    Turbulence
    Altitude
    see Transportation/Stationary
6. Oceanography
    Tide variations
    Water salinity
    Water quality
    Current speed/direction
    Transportation/Stationary 7. Animal Husbandry:
See medical
Birthing-time indicator
Heat sensing indicator as in locating specific location of equine lameness in foreleg
8. Ham Radio Applications
Indicators for meters that are difficult to read because of size/user's eye sight problems i.e. SWR meters
9. Industrial Applications:
Sub-sonic through supersonic indicators
DC indicators
Digital indicators
Heat/pressure/volume/flow rate/vibration indicators
10. Entertainment/Holidays
Christmas/Holiday lighting
IPod/Mp3/CD player/Other audio sources
Mood lighting—floor/ceiling/walls—indoor/outdoor
Jewelry
Commercial Signage While the apparatus has been described in connection with various embodiments, it is not intended to limit the scope of the apparatus to the particular form set forth, but on the contrary, it is intended to cover such alternatives, modifications, and equivalents as may be included within the spirit and scope of the apparatus as defined by the appended claims.

It is to be understood that the embodiments disclosed herein are shown for illustrative purposes and are not intended to be construed as limitations of the disclosed apparatus. Those skilled in the art will recognize or be able to ascertain in the course of routine experimentation, that variations and equivalents of the embodiments may be undertaken without departing from the scope of the apparatus.

Certain terms are used throughout the description to refer to particular components. As one skilled in the art will appreciate, design and manufacturing companies may refer to a component by different names. This document does not intend to distinguish between components that differ in name but not function.

The terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other intermediate devices and connections.

The term "LED output terminal" when used herein refers to a plurality of one or more discrete LEDs connected on parallel and having the same electrical characteristics or colors or to one or more of the same color component of tricolored LEDS connected on parallel and having the same electrical characteristics.

The term "subsonic-to-ultrasonic," when used herein may include any type of frequency input that may be used to control the LED lights as described.

The use of the word "a" or "an" when used in conjunction with the word "comprising" may mean "one", or may also mean "one or more." The use of the term "or" in the claims is used to mean "and/or" unless explicitly indicated to refer to alternatives only or the alternatives are mutually exclusive, although the disclosures supports a definition that refers to only alternatives and "and/or."

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. An analog LED controller comprising:
a power supply terminal;
a voltage reference source having a DC reference voltage;
an analog input terminal;
a plurality of color LED control circuits comprising a first color LED control circuit, one or more nth color LED control circuits and a Nth color LED control circuit, wherein 1<n>N and N=a total number of the color LED control circuits;
the first color LED control circuit comprising: (1) a first variable gain DC amplifier coupled with the power supply terminal, the voltage reference source and the input terminal, wherein the first variable gain DC amplifier provides (a) a maximum voltage gain whenever an input voltage at the analog input terminal is approximately equal to 0 VDC, and (b) a minimum voltage gain whenever the input voltage at the analog input terminal is approximately equal to or greater than 1/(N−1) of the DC reference voltage, (2) a first limiter coupled with the first variable gain DC amplifier, (3) a first LED driver circuit coupled with the power supply terminal and the first limiter, and (4) a first analog LED output terminal coupled to the first LED driver circuit;
each nth color LED control circuit comprising: (1) a nth variable gain DC amplifier coupled with the power supply terminal and the input terminal, wherein the nth variable gain DC amplifier provides (a) the maximum voltage gain whenever the input voltage at the analog input terminal is approximately equal to (n−1)/(N−1) of the DC reference voltage, and (b) the minimum voltage gain whenever the input voltage at the analog input terminal is approximately less than or equal to (n−2)/(N−1) of the DC reference voltage or approximately equal to n/(N−1) of the DC reference voltage, (2) a nth limiter coupled with the nth variable gain DC amplifier, (3) a nth LED driver circuit coupled with the power supply terminal and the nth limiter, and (4) a nth analog LED output terminal coupled to the nth LED driver circuit; and the Nth color LED control circuit comprising: (1) a fixed gain DC amplifier coupled with the power supply terminal and the input terminal, wherein the fixed gain DC amplifier provides a maximum engineered voltage gain, (2) a Nth limiter coupled with the fixed gain DC amplifier, (3) a Nth LED driver circuit coupled with the power supply terminal and the Nth limiter, and (4) a Nth analog LED output terminal coupled to the Nth LED driver circuit.

2. The controller as recited in claim 1, wherein the plurality of color LED control circuits are configured to control three or more color LEDs selected from the group of colors consisting essentially of blue, green, red, yellow, white, ultraviolet and infrared.

3. The controller as recited in claim 1, further comprising one or more color LEDs coupled to each of the plurality of analog LED output terminals.

4. The controller as recited in claim 3, wherein the color LEDs comprise one or more blue LEDs, one or more green LEDs and one or more red LEDs.

5. The controller as recited in claim 1, wherein N=3 and further comprising at least one tricolor LED coupled to the plurality of analog LED output terminals.

6. The controller as recited in claim 1, wherein N=3, the DC reference voltage is approximately 5 VDC, and the plurality of limiters limit a current to each analog LED output terminal to a maximum forward current of each LED connected to the analog LED output terminal.

7. The controller as recited in claim 1, further comprising a set of color LEDs coupled to each of the plurality of analog LED output terminals wherein the color LEDs within each set of color LEDS are connected in parallel.

8. The controller as recited in claim 7, wherein additional LEDs are added to each set of LEDs without having to modify the controller.

9. The controller as recited in claim 1, wherein N=3 and a voltage and a current at each analog LED output terminal for a given input voltage correspond approximately to Table 1.

10. The controller as recited in claim 1, wherein a gradual change in the input voltage results in a relatively smooth transition of colors from a first color to a nth color to a Nth color.

11. The controller as recited in claim 1, further comprising a power supply coupled to the power supply terminal.

12. The controller as recited in claim 1, further comprising a sensor coupled to the analog input terminal.

13. The controller as recited in claim 12, wherein the sensor measures pressure, volume, temperature, flow rate, frequency, velocity, acceleration, range, radiation, audible sound, inaudible sound, visible light, non-visible light, rotation, motion, heat, smoke, alignment, position, level, altitude, depth, mechanical parameters, electrical parameters, biological parameters, or chemical parameters.

14. The controller as recited in claim 12, wherein the controller provides a visual indication of a change-of-state of the sensor.

15. The controller as recited in claim 1, wherein the analog input port is coupled to a diagnostic or testing device.

16. An analog LED controller comprising:
a power supply terminal;
an analog input port;
an amplifier coupled with the power supply terminal and the analog input port, wherein the amplifier receives a time-varying signal from the input port and amplifies the time-varying signal using a non-linear frequency-based gain profile;
a plurality of color LED control circuits comprising a first color LED control circuit, one or more nth color LED control circuits and a Nth color LED control circuit, wherein 1<n>N and N=a total number of the color LED control circuits;
a first color LED control circuit comprising: (1) a first band-pass filter coupled with the power supply terminal and the amplifier, (2) a first limiter coupled with the first band-pass filter, (3) a first LED driver circuit coupled with the power supply terminal and the first limiter, and (4) a first analog LED output terminal coupled to the first LED driver circuit;
each nth color LED control circuit comprises: (1) a nth band-pass filter coupled with the power supply terminal and the amplifier, (2) a nth limiter coupled with the nth band-pass filter, (3) a nth LED driver circuit coupled with the power supply terminal and the nth limiter, and (4) a nth analog LED output terminal coupled to the nth LED driver circuit; and
a Nth color LED control circuit comprising: (1) a Nth band-pass filter coupled with the power supply terminal and the amplifier, (2) a Nth limiter coupled with the Nth band-pass filter, (3) a Nth LED driver circuit coupled with the power supply terminal and the Nth limiter, and (4) a Nth analog LED output terminal coupled to the Nth LED driver circuit.

17. The controller as recited in claim 16, wherein the plurality of color LED control circuits are configured to control three or more color LEDs selected from the group of colors consisting essentially of blue, green, red, yellow, white, ultraviolet and infrared.

18. The controller as recited in claim 16, further comprising one or more color LEDs coupled to each of the plurality of analog LED output terminals.

19. The controller as recited in claim 18, wherein the color LEDs comprise one or more blue LEDs, one or more green LEDs and one or more red LEDs.

20. The controller as recited in claim 16, wherein N=3 and further comprising at least one tricolor LED coupled to the plurality of analog LED output terminals.

21. The controller as recited in claim 16, further comprising a set of color LEDs coupled to each of the plurality of analog LED output terminals wherein the color LEDs within each set of color LEDS are connected in parallel.

22. The controller as recited in claim 21, wherein additional LEDs are added to each set of LEDs without having to modify the controller.

23. The controller as recited in claim 16, wherein N=3 and a center frequency of the band-pass filters is approximately 250 Hz, 1.2 kHz and 7 kHz, respectively.

24. The controller as recited in claim 16, wherein N=3 and a center frequency of the band-pass filters is approximately 100-250 Hz, 1 kHz and 7.5 kHz, respectively.

25. The controller as recited in claim 16, wherein the non-linear frequency-based gain profile corresponds to FIG. 2A.

26. The controller as recited in claim 16, wherein the nonlinear frequency-based gain profile provides a balanced mix of colors whenever the time-varying signal is a musical signal.

27. The controller as recited in claim 16, wherein the controller accurately transforms the time-varying signal into a visual representation of the time-varying signal.

28. The controller as recited in claim 16, further comprising a power supply coupled to the power supply terminal.

29. The controller as recited in claim 16, wherein the time-varying signal comprises music, voice or other sounds.

30. The controller as recited in claim 16, wherein an audio playback device is coupled to the input port.

31. The controller as recited in claim 16, wherein the analog input port is coupled to a diagnostic or testing device.

* * * * *